(12) United States Patent
Ledbetter et al.

(10) Patent No.: US 8,466,584 B1
(45) Date of Patent: Jun. 18, 2013

(54) PORTABLE CHARGE CLOSE TRIP DEVICE

(76) Inventors: Finley Lee Ledbetter, Argyle, TX (US); Ashley Sue Ledbetter, Argyle, TX (US)

( * ) Notice: Subject to any disclaimer, the term of this patent is extended or adjusted under 35 U.S.C. 154(b) by 299 days.

(21) Appl. No.: 12/784,681

(22) Filed: May 21, 2010

Related U.S. Application Data

(63) Continuation-in-part of application No. 12/361,223, filed on Jan. 28, 2009, now Pat. No. 7,804,201, and a continuation-in-part of application No. 12/500,523, filed on Jul. 9, 2009, now Pat. No. 8,151,452.

(60) Provisional application No. 61/084,897, filed on Jul. 30, 2008.

(51) Int. Cl.
*H01H 47/00* (2006.01)

(52) U.S. Cl.
USPC .......................................................... 307/125

(58) Field of Classification Search
USPC .......................................................... 307/125
See application file for complete search history.

(56) References Cited

U.S. PATENT DOCUMENTS

| | | | |
|---|---|---|---|
| 4,713,501 A | 12/1987 | Herrmann | |
| 5,330,213 A | 7/1994 | Peruso | |
| 5,397,869 A | 3/1995 | Huen | |
| 5,465,031 A | 11/1995 | Nilssen | |
| 5,477,017 A | 12/1995 | Swindler et al. | |
| 6,404,620 B1 | 6/2002 | Piccione | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 7,804,201 B1 * | 9/2010 | Ledbetter | 307/125 |
| 7,825,344 B2 | 11/2010 | Stevenson | |
| 2003/0200648 A1 | 10/2003 | Greer | |
| 2005/0194243 A1 | 9/2005 | Prineppi | |
| 2010/0024191 A1 | 2/2010 | Ledbetter | |

* cited by examiner

*Primary Examiner* — Robert L. Deberadinis
(74) *Attorney, Agent, or Firm* — Gardere Wynne Sewell LLP

(57) ABSTRACT

A portable motorized charge, trip, close device for manually charging, closing, or tripping circuit breakers or electrical equipment surrounded by a metal surface is described herein. The portable motorized charge, trip, close device can be operated by an operator, while the operator is outside an arc flash hazard boundary. The device can include a frame, handles, at least two magnetic housings connected to the frame, a gear box with a charging rod collar, a rotatable shaft, a charging rod moveable mount, a charging rod connected to two rotatable hinges, an adjustable closeable motor mount bracket, a gear box key way, a shaft housing, a motor, a motor control, a linear actuator engaging the rotatable hinges, a solenoid, a pressure release pin and spring, and a limit switch.

21 Claims, 8 Drawing Sheets

PORTABLE CHARGE CLOSE TRIP DEVICE

CROSS REFERENCE TO RELATED APPLICATIONS

The present application is a continuation-in-part co-pending U.S. patent application Ser. No. 12/361,223 filed Jan. 28, 2009, entitled "PORTABLE REMOTE SWITCH OPERATOR SYSTEM" and is a continuation-in-part of co-pending U.S. patent application Ser. No. 12/500,523 filed Jul. 9, 2009, entitled "PORTABLE ELECTRICAL EQUIPMENT RACKING TOOL", which claims priority and the benefit of U.S. Provisional Patent Application Ser. No. 61/084,897 filed on Jul. 30, 2008, entitled "CIRCUIT BREAKER REPLACEMENT TOOL". These references are incorporated herein in their entirety.

FIELD

The present embodiments generally relate to a charge, close, trip device for manually causing electrical equipment to charge, close, trip, or combinations thereof for manually operated circuit breakers in metal cabinets or metal housings having surrounding metal surfaces. The device can be remotely operated by a human outside an arc flash hazard boundary thereby reducing a need for personal protection equipment and improving safety in the workplace.

BACKGROUND

A need exists for a remotely operated charge, close, trip device that can magnetically secure to metal around manually operated circuit breakers and can be remotely operated by a human outside an arc flash hazard boundary using a portable signal and power unit.

A further need exists for a charge, close, trip device usable with switch gears or circuit breakers, wherein the device does not need to attach to a wall outlet for power and is essentially "cordless" to a power grid, thereby providing improved safety in a facility by reducing tripping hazards for workers and reducing the chance that an arc could effect the main power supply of the facility.

A need exists for a circuit breaker charge, close, trip device that can be run by an operator at least six feet and up to fifty feet away from the device.

BRIEF DESCRIPTION OF THE DRAWINGS

The detailed description will be better understood in conjunction with the accompanying drawings as follows.

Figure 1:
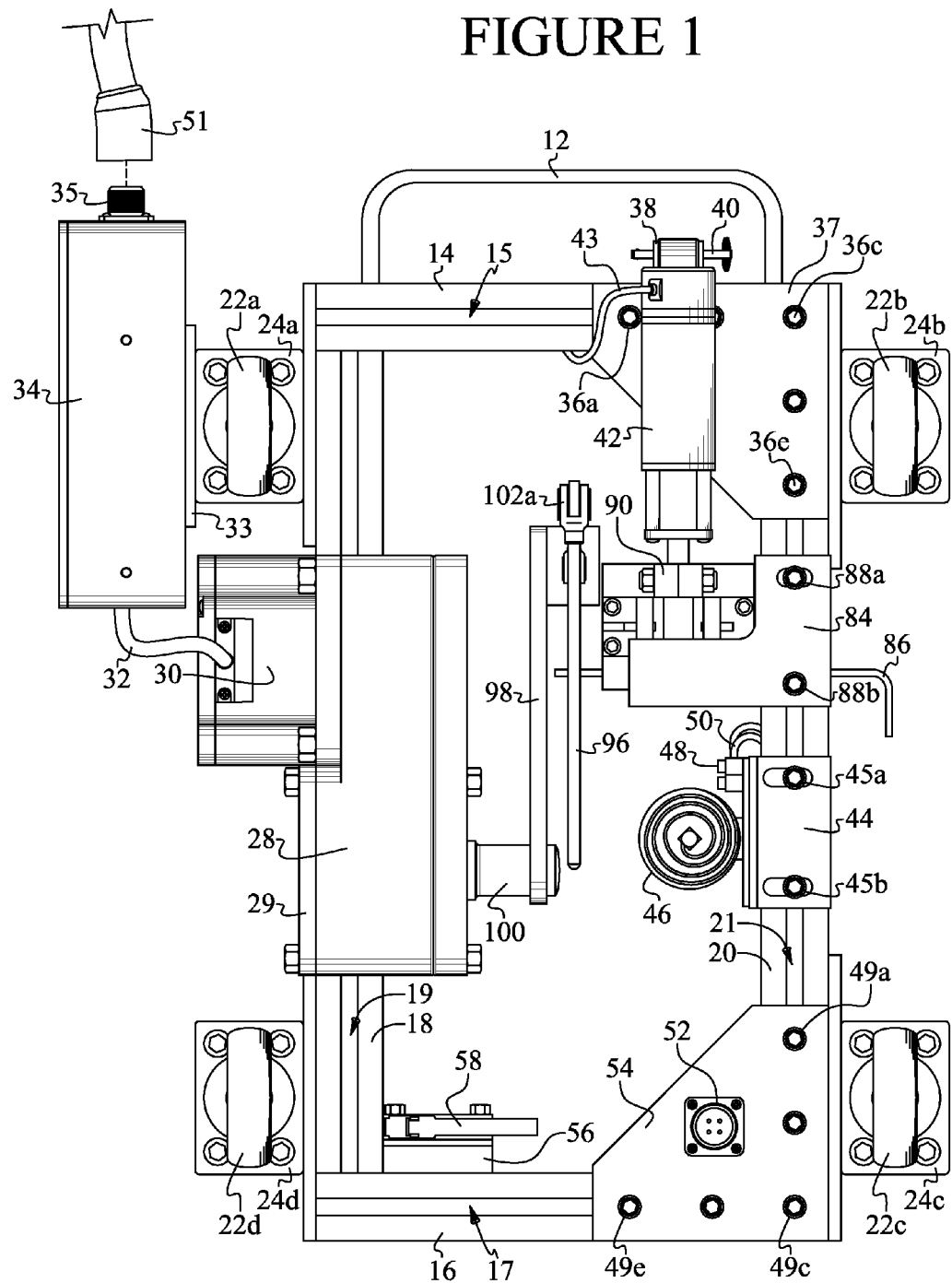
FIG. 1 is a top of a charge, close, trip device.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments and that each can be practiced or carried out in various ways.

The present embodiments relate to a robotic tool for causing manually operated circuit breakers to charge, close, or trip when the circuit breakers are within a hazardous arc flash zone.

The charge, close, trip motorized robotic tool can effectively protect the operator from immediate danger from arc flashing when attempting to charge, close, or trip electrical equipment.

Operators can be located from about six feet to about twenty five feet away from the arc flash hazard, while operating the robotic tool. In embodiments, the operator can be in another room.

The charge, close, trip motorized robotic tool can reduce the need of a facility to buy a large quantity of heavy personal protective equipment which can be expensive, hot, and heavy to wear. The hot heavy personal protective equipment suits, when worn for a long period of time, have been known to cause health problems for operators due to heat exhaustion. The use of the robotic tool with a portable remote control and power supply can improve worker safety by minimizing the amount of time the worker is in the arc flash suit.

The charge, close, trip motorized robotic tool can reduce the amount of time that an operator must wear an arc flash suit. The robotic tool can quickly charge, close, or trip electrical circuit breakers, such as at a speed that is faster than a human can rotate.

The charge, close, trip motorized robotic tool can allow an operator to be out of an immediate zone of danger, which prevents the operator from experiencing fire or explosion during charging, closing, or tripping on a manually operated circuit breaker.

The charge, close, trip motorized robotic tool can move a charging rod that can in-turn cause charging, closing, tripping, or combinations thereof for a target device, such as a manual circuit breaker or other manually actuable electrical equipment surrounded by a metal surface.

The robotic tool can have a frame made from a first side support connected to a parallel second side support opposite the first side support by a beam. At least one beam can be used, but two beams forming a square or rectangular frame can be used. Both side supports and the beam or beams can be made from aluminum metal. The aluminum metal can be smooth. A channel or channels can be formed in the aluminum metal on each side of the supports and beams.

The aluminum metal can have a length from about six inches to about forty eight inches, a width six inches to about forty eight inches, and a depth from about two inches to about nine inches.

The frame can be formed of aluminum, composites including durable impact high melting point polymers such as polyethylene/polypropylene blends, alloys of other materials, or laminates of plastic or polymer over metals to create a very lightweight structure.

Each bar can have a channel that can have a channel depth between 1/32 inch and 1/2 inch. The channel depth can be deep enough to receive mounting bolts and other removable fasteners that can slide in the channel.

The side supports can be larger or smaller and can have unequal lengths. The side supports can be formed of a material that does not deform when supporting the equipment on the frame or upon being dropped from a height of about six feet onto concrete.

The frame can be generally rectangular but can be square or even circular.

If the frame is rectangular or square, it can have four corners. Near each corner, at least one magnetically shielding magnetic housing can be fastened. Each magnetically shielded magnetic housing can contain a magnet that can be extended and retracted therefrom. The magnetic housing can completely shield the magnets when the magnets are in a retracted position.

The magnets can be extended and retracted, such as with a magnetic handle. The magnets can hold the frame over the circuit breaker, while the charging, closing, and tripping occur. A magnet handle can be used to move the magnets from the housing and to rotate the magnets.

The charge, close, trip robotic tool can be easily maintained and can have an open frame construction. The open frame construction can allow for ease of repairs to motors, solenoids, gear boxes, and gear assemblies of the robotic tool. The ease of replacement of components can be a significant advantage when a larger solenoid is needed or a larger linear actuator is needed.

A remote switch operator can be used as the signal source and power supply for the robotic tool.

The remote switch operator (also referred to herein as the RSO) can be used to control the device using a remote controller, thereby allowing the operator to stand in another room while still providing signals and power to the robotic tool device.

Due to the use of the remote switch operator, the robotic tool can be used without the need for attaching the robotic tool to an electric wall socket with a cord, thereby significantly preventing a tripping hazard in the facility when using the robotic tool.

The remote switch operator can have a rugged, water-resistant, and impact-resistant housing, such as a sturdy plastic or urethane based housing. The remote switch operator can be controlled by the operator using a wireless connection to the remote controller or using a wired connection from the remote controller to the housing of the remote switch operator.

The housing of the remote switch operator can have a body, which can further have a closeable lid that can be hinged and/or latched to the body. The lid can be attached with fasteners to the body in a closed and generally watertight position.

The charge, close, trip motorized robotic tool can be used with electrical equipment, such as a low voltage circuit breaker up to 1000 volts, a medium voltage circuit breaker with voltages between 1000 and 20000 volts, a switch gear, a motor control center, or a contactor.

Turning now to the Figure, FIG. 1 is a top view of the charge, close, trip device.

The device can have a frame with a frame handle 12 that can be removable and slidable within a side channel in a first beam 14 on the frame.

The frame can be formed from with the first beam 14 and a second beam 16 disposed opposite the first beam 14. A first side support 18 and a second side support 20 can connect to the first beam 14 and the second beam 16. The first side support 18 and the second side support 20 can be parallel to each other. The first beam 14 and the second beam 16 can be parallel to each other. The frame can be a rectangular configuration. The frame can be square, round, or elliptical.

The first side support 18 can include a channel 19. The second beam 16 can include a channel 17. The second side support 20 can have a channel 21. The first beam 14 can have a channel 15.

At least partially magnetically shielded magnet housings 24a, 24b, 24c, and 24d can be attached to the frame.

The magnetic housings 24a, 24b, 24c, and 24d can be magnetically shielding on five sides.

The magnet housings 24a, 24b, 24c, and 24d can be removably fastened into side channels of each side support. The magnet housings 24a, 24b, 24c, and 24d can be positioned in the channels to be slidably and moveably positioned on an outside portion of the frame, allowing the frame to have great versatility and to be engageable over various sizes of electrical equipment needing charging, closing, or tripping.

A gear box 28 can be fastened to the first side support 18. The gear box 28 can have a gear assembly that can connect to a motor 30 that can rotate a charging rod 96 in at least two different directions.

A motor mount bracket 29 can be attached between the gear box 28 and the first side support 18. The motor mount bracket 29 can support the motor 30.

A motor signal power cable 32 can connect between the motor 30 and a control box 34. The control box 34 can provide signals to the motor 30.

The motor 30 can be a direct drive or variable drive motor made by Oriental Motor of Taiwan.

The control box 34 can be fastened to a control box mount 33 which can support the control box 34 and engage the magnetically shielded magnet housing 24a. The magnetically shielded magnet housing 24a can be removably attached to the frame.

The device can include magnet handles 22a, 22b, 22c, and 22d which can be attached to each magnet.

The magnet handles 22a, 22b, 22c, and 22d can allow the magnets to rotate and extend from the magnet housings 24a, 24b, 24c, and 24d to engage a metal surface surrounding a switch gear, a circuit breaker, or other electrical equipment needing charging, closing, or tripping while being otherwise contained in the magnet housings 24a, 24b, 24c, and 24d. The magnet housings 24a, 24b, 24c, and 24d can provide a shield of the magnetic fields to other components, thereby preventing the magnets from attracting other wires, screws, and other metal objects. The magnet housings 24a, 24b, 24c, and 24d can be a significant feature of the robotic tool, providing for fast attaching and releasing while not attracting other metal objects.

Each magnet can be round with a smooth face having a diameter from about one to three inches, and a thickness from about ¼ to 2 inches, or even larger. Large or small magnets can be used.

The gear box 34 can have an interface connector 35 for securing the motor signal power cable to the gear box 34.

A linear actuator 42 can be an LT-50-2-50 electric actuator made by Duff Norton, of North Carolina.

The linear actuator 42 can be mounted to the first beam 14. The linear actuator can first be fastened to a linear actuator frame mount 37 that can be slidably fastened to both the first beam 14 and the second side support 20 using fasteners that engage the top channels of both the first beam 14 and the second side support 20.

A linear actuator bracket 38 attaches to the linear actuator frame mount 37 in this embodiment to provide the linear actuator with a secure engagement with the frame.

The linear actuator bracket 38 can be secured to the linear actuator frame mount using a bracket pull pin 40. The bracket pull pin 40 can have a cotter pin on one side to hold the pin in place.

A linear actuator signal power cable 43 can be secured to the linear actuator 42 on one end and can provide both electricity and signals to the linear actuator 42. The linear actuator signal power cable 43 can be in communication with an interface plug or connector for receiving power and signals from a remote switch operator.

The linear actuator frame mount 37 cab be held to the second side support 20 with linear actuator bracket bolts 36a, 36c, and 36e.

An actuatable plate 90 can be viewed supporting the linear actuator 42 with the linear actuator signal and power cable 43.

A solenoid 46 can be mounted to the second side support 20 opposite the motor and within the perimeter of the frame, thereby providing a "small footprint" device. The solenoid 46 can be powered by a solenoid signal power cord 50 that can connect to the solenoid 46 via a solenoid terminal 48.

The solenoid 46 can first be mounted to a solenoid mount bracket 44 that can be fastened to the second side support 20 using bolts in the top channel of the second side support 20. The solenoid 46 can then be mounted on an interior of the frame to the solenoid mount bracket 44, ensuring a sturdy connection to the solenoid 46. The solenoid 46 can have a plunger for moving in and out. The solenoid plunger can actuate a mechanism on the circuit breaker.

The solenoid signal power cord 50 can connect to a solenoid interface plug 52 mounted to a solenoid interface plug bracket 54 that can closeably engage to channels in both the second beam 16 and the second side support 20, thereby providing a secure vibration free attachment between the components while allowing ease of removability and replacement for maintenance purposes.

The solenoid interface plug bracket 54 can be bolted to channels of the second side support 20 and the second beam 16 using bolts 49a, 49c, and 49e.

The solenoid mount bracket 44 can be removably secured to the channel of the second side support 20 with solenoid mounting bracket bolts 45a and 45b.

A limit switch 58 can be mounted to a limit switch bracket 56 that can attach with closeable slidable fasteners that engage the channels of both the second beam 16 and the first side support 18.

The ability of the components to be fastened to two portions of the frame can provide a very sturdy robotic tool for use in electrical equipment trip, enabling the frame to resist deforming.

A pressure release spring with a pressure release pin 86 can be supported on a slidable bracket 84 which can engage the second side support 20 by fastening to the top channel 21 of the second side support with moveable bolts 88a and 88b.

The charging rod 96 can be mounted within the frame by using a first charging rod moveable mount 98 which can engage at least one rotatable hinge 102a.

The charging rod movable mount 98 can engage a charging rod collar 100 connected to the gear box 28.

The charging rod 96 can rotate, allowing the charging arm to first move in one direction in an arc, and then to move in the opposite direction in the arc. The charging rod 96 can rotate from 1 to 180 degrees through the arc to charge, close, or trip an electrical device.

The device can engage a remote switch operator for power and signals which can in turn have a remote controller for use by an operator.

The remote switch operator can connect to the control box 34 at interface connector 35 with wire 51, or to the solenoid interface plug 52.

Figure 2:
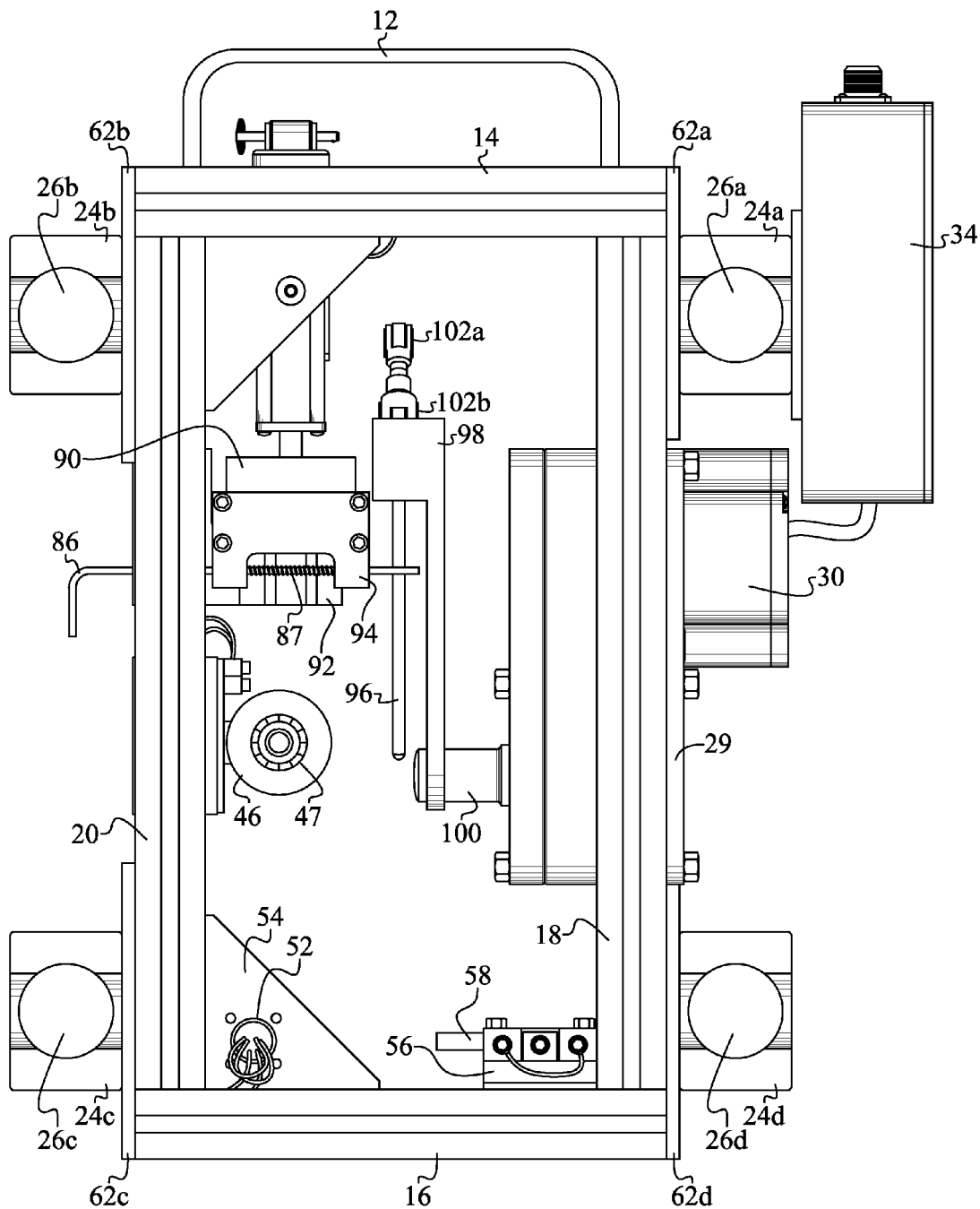
FIG. 2 is a bottom view of the charge, close, trip device.

FIG. 2 is a bottom view of the charge, close, trip device shown in FIG. 1.

The device can have a frame with a frame handle 12 that can be removable and slidable within a side channel in a first beam 14 on the frame. The first side support 18 can be perpendicular to the first beam 14, and perpendicular to the second beam 16.

A limit switch 58 can be mounted to a limit switch bracket 56 that can attach with closeable slidable fasteners that engage the channels of both the second beam 16 and the first side support 18.

A solenoid interface plug 52 can be mounted to a solenoid interface plug bracket 54 that can closeably engage to channels in both the second beam 16 and the second side support 20

A pressure spring 87 can be engaged with the pressure release pin 86.

Four magnets 26a, 26b, 26c, and 26d can slide in and out of the magnet housings 24a, 24b, 24c, and 24d.

The magnet housings 24a, 24b, 24c, and 24d can be connected to the frame using magnet mount brackets 62a, 62b, 62c, and 62d.

The motor mount bracket 29 can mount the motor 30 to the frame. The motor mount 30 can be connected to the control box 34. The control box 34 can provide signals to the motor 30.

The second side support 20 can have an actuatable plate mount 94 mounted thereon, which can support the actuatable plate 90 and a slide rail 92.

The solenoid 46 can have a solenoid plunger 47.

A second rotatable hinge 102b can engage the first rotatable hinge 102a. The charging rod moveable mount 98 can engage the second rotatable hinge 102b as well as the charging rod collar 100. The charging rod 96 can be connected to the charging rod moveable mount 98.

Figure 3:
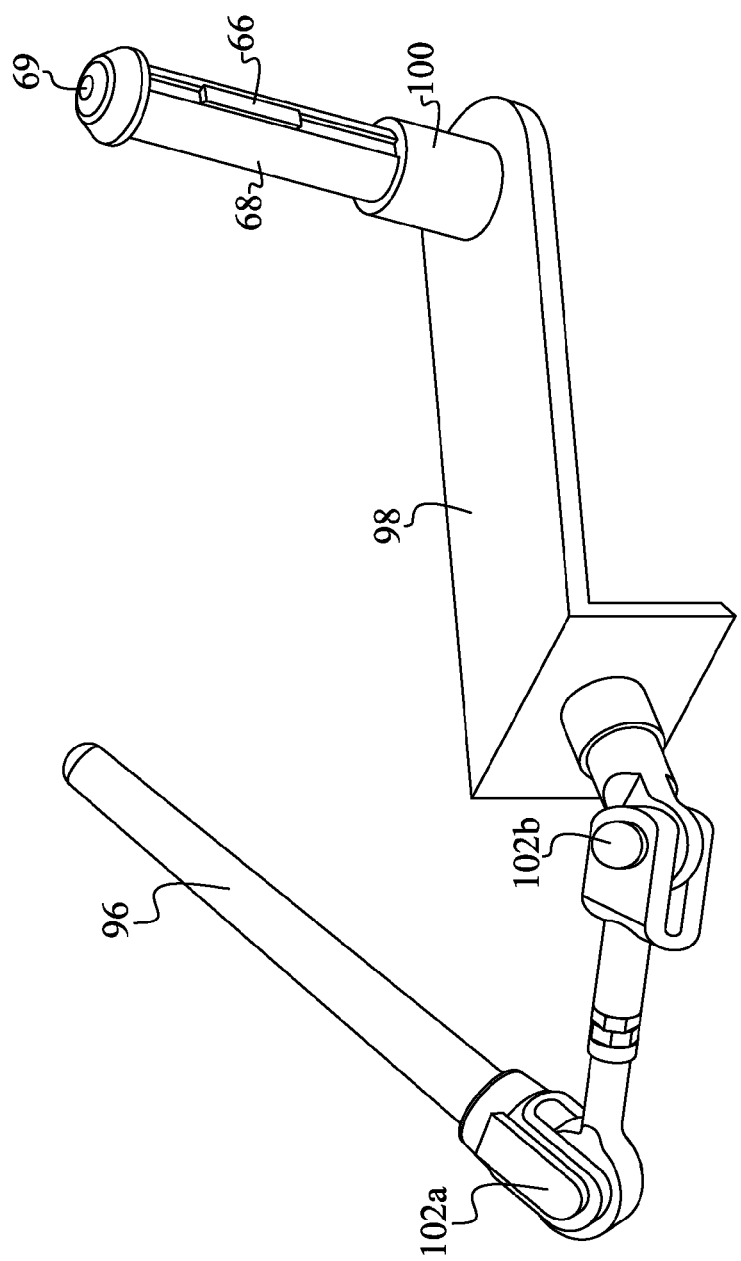
FIG. 3 is a detail of the charging rod and associated moving parts.

FIG. 3 is a detailed view of the charging rod 96 along with associated components.

The charging arm 96 can be engaged with a first rotatable hinge 102a which can engage with a second rotatable hinge 102b.

The second rotatable hinge 102b can engage the charging rod moveable mount 98 which can engage the charging rod collar 100.

The charging rod collar 100 can engage the rotatable shaft 68 with a key 66. A gear box collar 69 can connect to the rotatable shaft 68.

Figure 4:
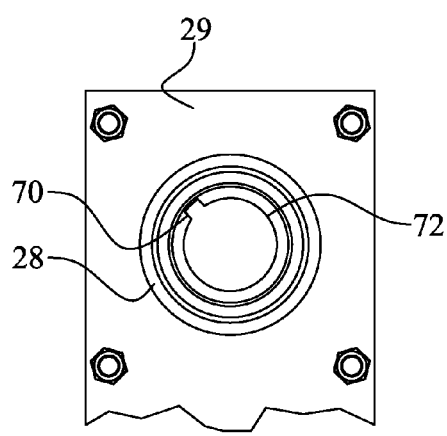
FIG. 4 is a front view of an embodiment of the motor mount bracket.

FIG. 4 is a detailed front view of an embodiment of the motor mount bracket 29. The motor mount bracket 29 can have a gear box 28 with a shaft housing 72 and a gear box key way 70.

Figure 5:
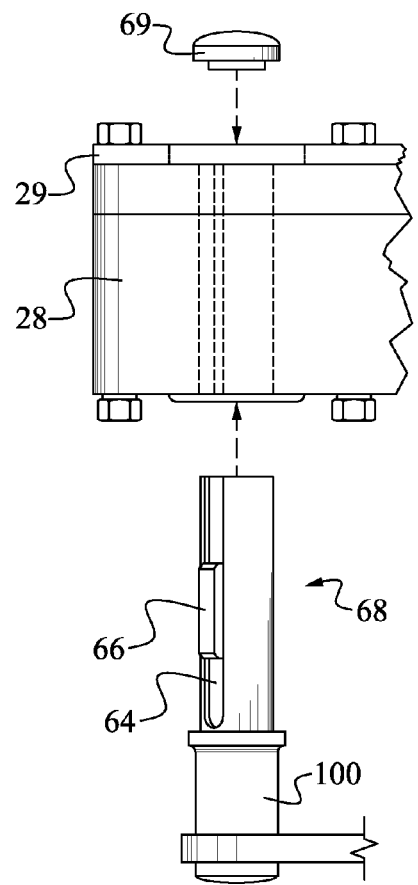
FIG. 5 is a view of a segment of the gear assembly.

FIG. 5 is an exploded side view of the gear assembly usable herein.

The gear box collar 69 can engage the rotatable shaft 68 on one end, and the charging rod collar 100 on the other end. The key 66 can be disposed in the shaft key way 64. The key 66 can be removable and reinserted.

The gear box 28 can be connected to the motor mount bracket 29. The rotatable shaft 68 can extend through the gear box 28 and motor mount bracket 29 to connect to the gear box collar 69.

Figure 6:
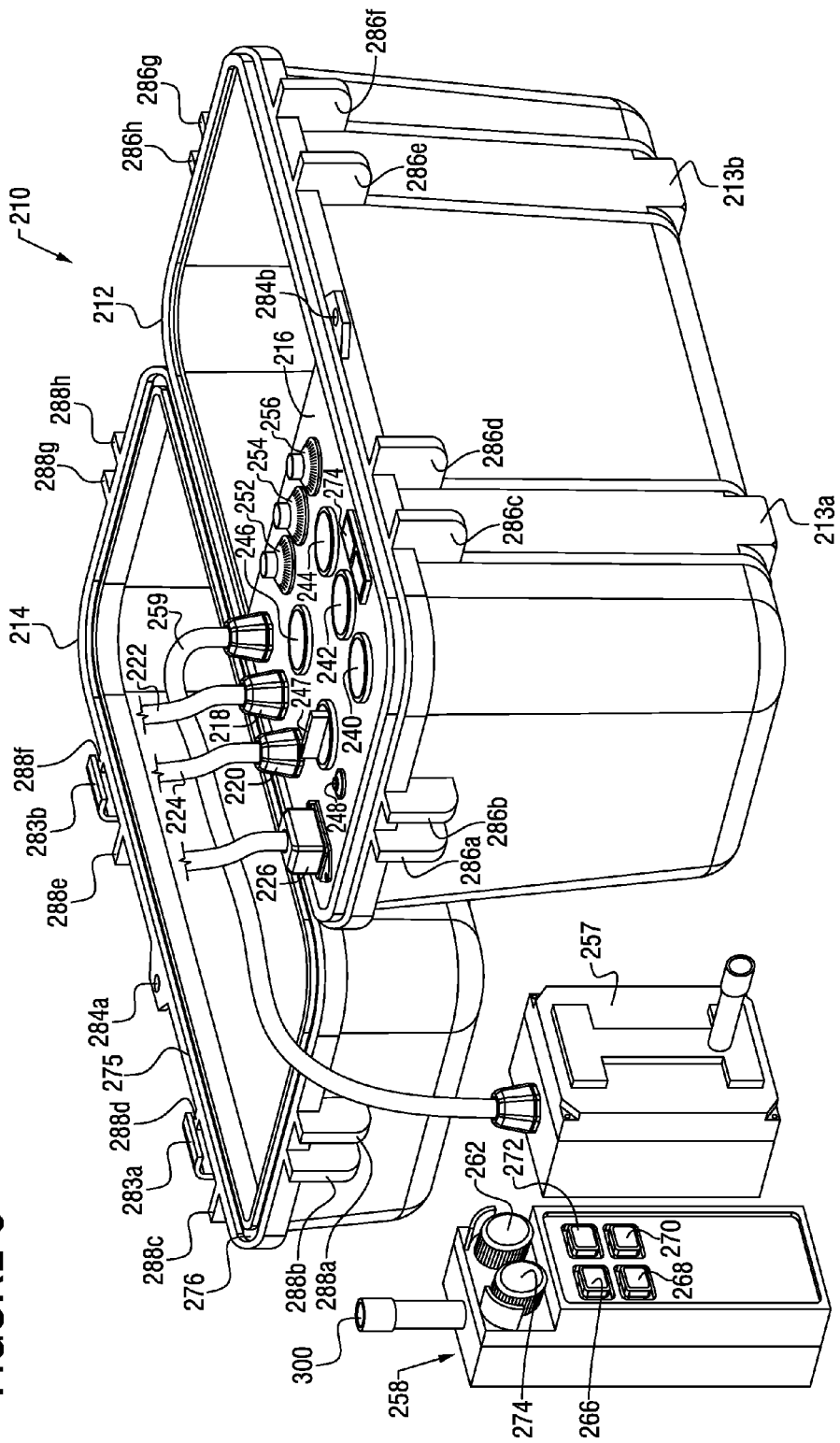
FIG. 6 is a remote switch operator.

FIG. 6 is a front perspective view of the RSO housing 210 with body 212 and lid 214.

A groove 275 can be formed in the lid 214 on the side facing the body 212. A seal 276 can be disposed in the groove 275, such as a rubber gasket or other means to keep water from entering the housing when the lid 214 is latched to the body 212. The seal 276 can be a continuous rubberized gasket about ⅛ inch in diameter.

Latching means 283a and 283b can connect the lid 214 to the body 212. In embodiments, only one latching means can be used.

Locking means 284a and 284b can be used to lock the lid 214 to the body 212.

The body 212 can have rigid integral support feet 213a and 213b.

Body reinforcing ribs 286a, 286b, 286c, 286d, 286e, 286f, 286g, and 286h can be disposed on a side of the body 212, and can be molded into the body 212.

Lid reinforcing ribs 288a, 288b, 288c, 288d, 288e, 288f, 288g, and 288h can be formed in the lid 214 as the lid is molded.

The face plate 216 can have a first plug 218 for transmitting current and signal from the housing to the charge, close, trip device.

The face plate 216 can have a second plug 220 for additionally transmitting current and signals from the housing to the charge, close, trip device.

A first cord 222 can engage the first plug 218. A second cord 224 can engage the second plug 220.

A DC charge plug 226 can be disposed in the face plate 216 for receiving DC power from a battery charger, such as an AC/DC charger or from an inverter that is remote to the housing.

A trip momentary push button 240 can be in the face plate 216 for simultaneously sending signals and power to the at least one solenoid of the charge, close, trip device from the RSO.

A close momentary push button 242 can be in the face plate 216 for simultaneously sending signals and power to the at least one solenoid of the charge, close, trip device from the RSO.

A charge/close momentary push button 244 can connect between the circuit board and the battery for sending signals and power to the motor of the charge, close, trip device.

A jog momentary push button 246 can connect between the circuit board for controlling the motors from the RSO.

An on-off switch 247 can connect and disconnect the batteries from relays.

A circuit breaker 248 can be in the face plate 216 and can interrupt the circuit between the batteries and the relays when amperage exceeds a preset limit.

A first stroke potentiometer 252 can count strokes that operate the motor of the charge, close, trip device, such as how many times to rotate the rotatable shaft.

A first timer potentiometer 254 can provide signals to the motor of the charge, close trip device, such as how long, in units of time, to turn the rotatable shaft in a first direction.

A second timer potentiometer 256 can provide signals to the motor of the charge, close, trip device, such as how long, in units of time, to turn the rotatable shaft in a second direction.

A radio transmitter receiver 257 can be connected by a cord 259 to the relays and the batteries under the face plate 216.

An automatic shut off switch 274 can be in the face plate 216 for emergency use.

A wireless remote controller 258 with an antenna 300 can communicate with the RSO 210. The wireless remote controller can also have an automatic shut off switch 274 to disengage the RSO in case of an emergency.

The wireless remote controller 258 can have an on/off button 262 that can communicate to the RSO. Additionally, the wireless remote controller 258 can have a job button 266, a trip button 268, a close button 270, and a charge/close button 272 for controlling the circuits of the push button in a wireless manner.

Velcro™ or another attaching means can be used to secure the wireless radio controller 258 to the interior of the housing for easy transport.

Figure 7:
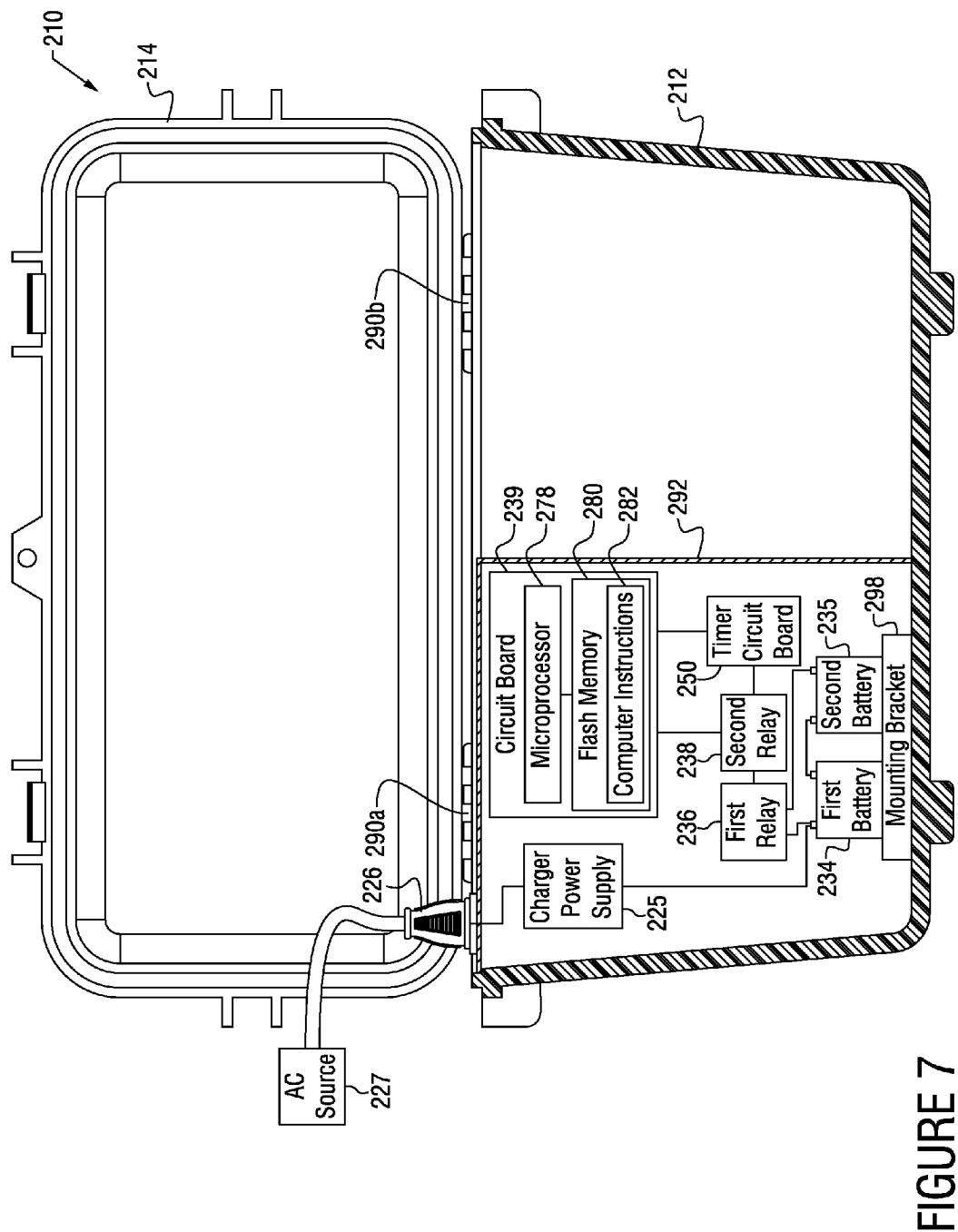
FIG. 7 is a diagram of electronics of the remote switch operator.

FIG. 7 is a view of the RSO 210.

The circuit board 239 can have a microprocessor 278 connected to a flash memory 280 with computer instructions 282 for comparing current sensed to predetermined limits, and when those limits are exceeded, shutting off the power coming from the RSO 210 to the charge, close, trip device.

The body 212 and lid 214 can be connected by a first hinge 290a and a second hinge 290b.

The face plate can have a face plate side 292 for securing other equipment tightly into the housing and preventing water from entering the electronics under the face plate.

The RSO 210 can have a first relay 236 and a second relay 238 which can be in communication with a first battery 234 and a second battery 235.

The timer circuit board 250 can be between the relays and the circuit board.

The batteries can be mounted on mounting bracket 298 in the housing.

A charger power supply 225 can engage the batteries.

An AC source 227 can be connected to the RSO 210 through a plug 226.

Figure 8:
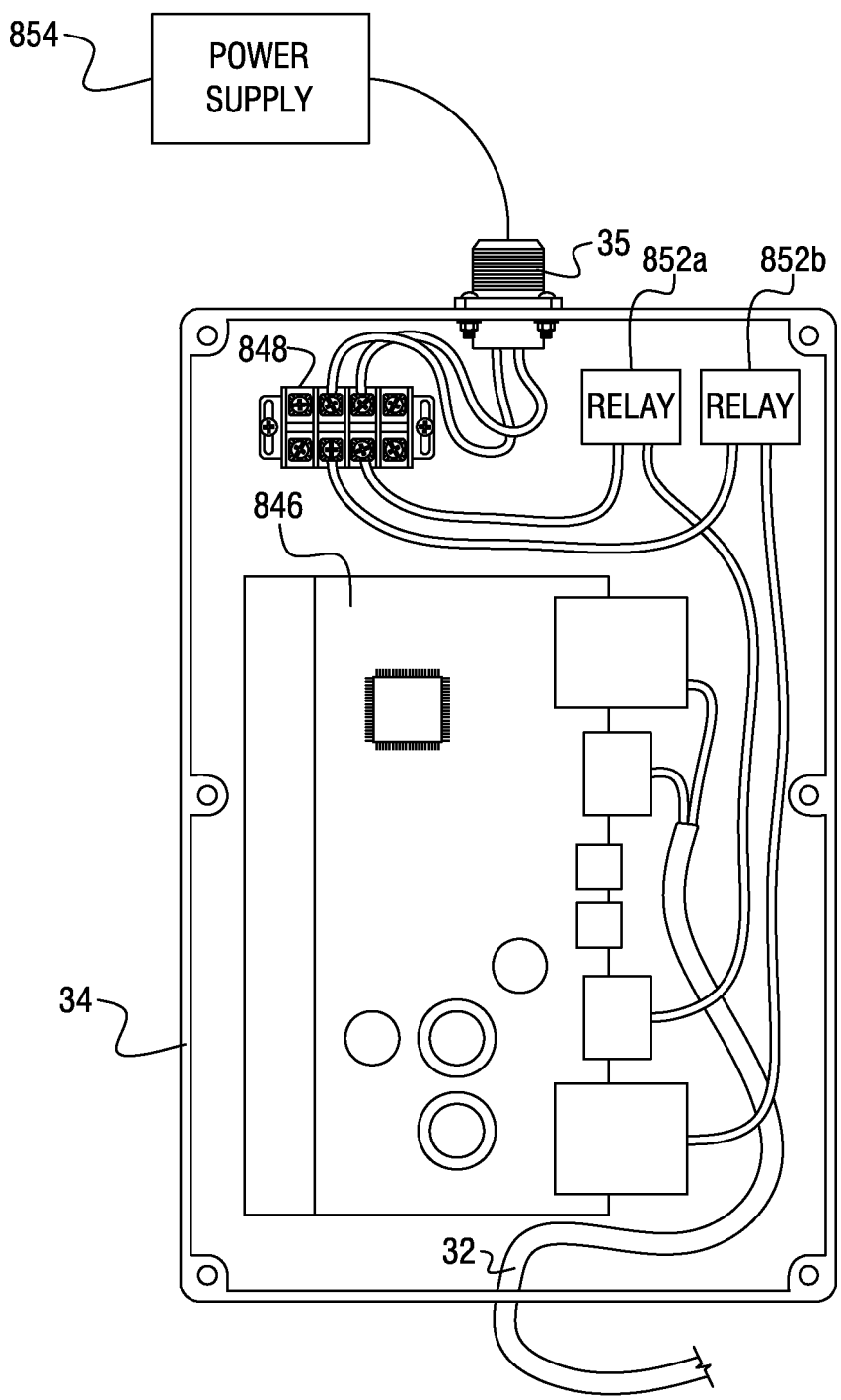
FIG. 8 is a view of a control box.

FIG. 8 shows a top view of the control box usable with this robotic tool.

In embodiments, the control box 34 can be made from aluminum or another lightweight metal alloys. The control box 34 can have a back and four sides all connected together and a removable top.

The control box 34 can receive power from a power supply 854 through the interface plug 35 on the control box.

Current can flow through the connectors 848 to relays 852a and 852b. From the relays, power can flow to the motor control circuit board 846. The motor signal and power cable 32 can run from the motor control circuit board to the motor.

Figure 9:
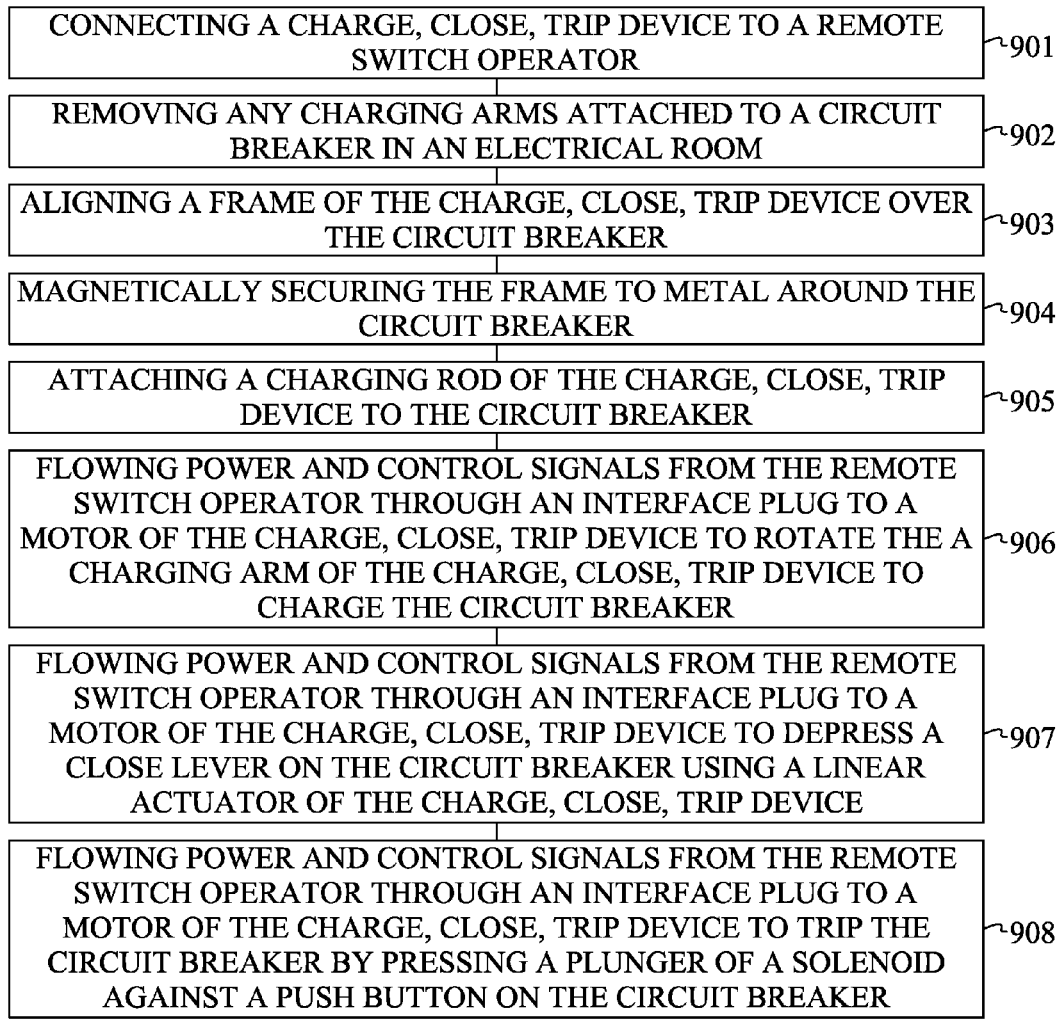
FIG. 9 shows an embodiment of the method.

FIG. 9 is an embodiment of a method for charging, closing, or tripping manually operated circuit breakers.

The method can include connecting a charge, close, trip device to a remote switch operator, as illustrated by box 901.

The method can include removing any charging arms attached to a circuit breaker in an electrical room, as illustrated by box 902.

The method can include aligning a frame of the charge, close, trip device over the circuit breaker, as illustrated by box 903.

The method can include magnetically securing the frame to metal around the circuit breaker, as illustrated by box 904.

The method can include attaching a charging rod of the charge, close, trip device to the circuit breaker, as illustrated by box 905.

The method can include flowing power and control signals from the remote switch operator through an interface plug to a motor of the charge, close, trip device to rotate the a charging arm of the charge, close, trip device to charge the circuit breaker, as illustrated by box 906.

The method can include flowing power and control signals from the remote switch operator through an interface plug to a motor of the charge, close, trip device to depress a close lever on the circuit breaker using a linear actuator of the charge, close, trip device, as illustrated by box 907.

The method can include flowing power and control signals from the remote switch operator through an interface plug to a motor of the charge, close, trip device to trip the circuit breaker by pressing a plunger of a solenoid against a push button on the circuit breaker, as illustrated by box 908.

While these embodiments have been described with emphasis on the embodiments, it should be understood that within the scope of the appended claims, the embodiments might be practiced other than as specifically described herein.

What is claimed is:

1. A charge, close, trip device for manually charging, closing, tripping or combinations thereof for manually operated circuit breakers that are surrounded by a metal surface, wherein the manually operated circuit breaker is operable by an operator outside an arc flash hazard boundary, wherein the device comprises:
   a. a frame comprising a first beam disposed between a first side support and a second side support;
   b. at least one magnetically shielding magnetic housing connected to one of the side supports, wherein the magnetically shielding magnetic housing contains a moveable magnet;
   c. a gear box connected to one of the side supports;
   d. a gear assembly in the gear box, wherein the gear assembly has a gear box collar that connects to a rotatable shaft that has an engagement key in a shaft key way, and wherein the gear box further comprises a gear box key way and a shaft housing for engaging the rotatable shaft;
   e. a charging rod collar secured to the rotatable shaft opposite the gear box collar, wherein the charging rod collar has a diameter larger than the rotatable shaft;
   f. a charging rod moveable mount that engages the rotatable shaft;
   g. a charging rod connected to at least one rotatable hinge secured to the charging rod moveable mount;
   h. a motor fastened to the frame;
   i. a control box in communication with the motor, wherein the control box is attached to the frame, to a component on the frame, or to the at least one magnetically shielding magnetic housing, and wherein the control box has an interface plug;
   j. a motor signal and power cable connecting the control box to the motor;
   k. a linear actuator secured to one of the side supports opposite the motor and connected to a power supply using a linear actuator signal power cable, wherein the linear actuator engages an actuatable plate;
   l. a solenoid with a solenoid plunger, wherein the solenoid is connected to one of the side supports opposite the motor, wherein the solenoid engages a solenoid signal power cord that connects to a solenoid interface plug mounted to the frame or to a solenoid interface plug bracket, and wherein the solenoid plunger engages a close button of a manually operated circuit breaker; and
   m. a limit switch connected to the motor via a limit switch cable, wherein the limit switch senses a position of the charging rod and prevents over-torqueing of a charging arm on the manually operated circuit breaker when the motor operates the charging rod to charge, close, trip, or combinations thereof the manually operated circuit breaker.

2. The device of claim 1, further comprising a second beam disposed between the first side support and the second side support, wherein the second beam comprises a second beam top channel, a second beam first side channel, a second beam second side channel, and a second beam bottom channel, and wherein the first beam comprises a first beam top channel, a first beam first side channel, a first beam second side channel, and a first beam bottom channel.

3. The device of claim 2, wherein the first side support comprises a first side support top channel, a first side support first side channel, a first side support second side channel, and a first side support bottom channel, and wherein the second side support comprises a second side support top channel, a second side support first side channel, a second side support second side channel, and a second side support bottom channel.

4. The device of claim 1, wherein the frame is a hollow aluminum.

5. The device of claim 1, wherein power is supplied to the interface plug from a remote switch operator.

6. The device of claim 1, wherein the control box comprises connectors that engage the interface plug, wherein the connectors communicate through relays to a motor control circuit board that engages the motor signal and power cable.

7. The device of claim 1, wherein the solenoid is mounted to a solenoid mounting bracket that is adjustably and closeably secured into the second side support top channel.

8. The device of claim 7, further comprising a terminal mounted to the solenoid mounting bracket for connecting the solenoid to the solenoid interface plug.

9. The device of claim 5, wherein the remote switch operator controls the charge, close, trip device, wherein the remote switch operator provides power to the charge, close, trip device, and wherein the remote switch operator comprises:
   a. a housing with a body and a closable lid;
   b. a face plate;
   c. at least one plug in the face plate for providing current and signals from the housing to the charge, close, trip device;
   d. a DC power plug for receiving power into the housing;
   e. a circuit board disposed beneath the face plate in the housing engaging at least one relay, wherein the at least one relay engages at least one battery connected to the DC power plug for connecting to a DC power source and for charging the at least one battery;
   f. a receiver/transmitter in communication with the circuit board;
   g. a remote controller removably connected to the remote switch operator for remotely actuating the at least one relay a distance from the remote switch operator;
   h. a trip momentary push button in the face plate engaging the circuit board;
   i. a close momentary push button in the face plate engaging the circuit board;
   j. a charge close momentary push button in the face plate engaging the circuit board; and
   k. a jog momentary push button in the face plate engaging the circuit board.

10. The device of claim 1, wherein the electrical equipment is a low voltage circuit breaker, a medium voltage circuit breaker, a switch gear, or a manually operated circuit breaker.

11. The device of claim 1, further comprising a solenoid interface plug bracket formed from ¼ inch plate steel through which a hole is disposed for receiving the solenoid signal and power cord to engage the solenoid interface plug.

12. The device of claim 1, wherein the frame has a width from eight inches to twenty four inches, a height from six inches to thirty inches, a depth from three inches to eight inches, and a weight of less than eighty pounds.

13. The device of claim 1, further comprising a limit switch bracket for supporting the limit switch between one of the beams and one of the support sides.

14. The device of claim 13, further comprising a bracket pull pin that closeably secures the linear actuator to a linear actuator bracket, wherein the linear actuator bracket secures to a linear actuator frame mount that closeably fastens to the frame.

15. The device of claim 5, wherein the remote switch operator is wirelessly connected to a remote controller.

16. The device of claim 15, wherein the remote controller has a trip momentary push button, a close momentary push button, a charge close momentary push button, and a jog momentary push button, wherein each push button actuates the at least one relay in the same manner as the buttons in the face plate.

17. The device of claim 1, further comprising a pressure release pin held in place by a pressure spring for tripping a trip button on the manually operated circuit breaker.

18. A charge, close, trip device for charging, closing, tripping or combinations thereof circuit breakers, wherein the device comprises:
   a. a frame comprising a first beam disposed between a first side support and a second side support;
   b. a magnetically shielding housing connected to one of the side supports, wherein the magnetically shielding housing contains a magnet;
   c. a gear box connected to one of the side supports;
   d. a gear assembly in the gear box, wherein the gear assembly has a gear box collar that connects to a rotatable shaft that has an engagement key in a shaft key way, and wherein the gear box further comprises a gear box key way and a shaft housing for engaging the rotatable shaft;
   e. a charging rod collar secured to the rotatable shaft opposite the gear box collar;
   f. a charging rod moveable mount that engages the rotatable shaft;
   g. a charging rod connected to at least one rotatable hinge secured to the charging rod moveable mount;
   h. a motor fastened to the frame;
   i. a control box in communication with the motor, wherein the control box has an interface plug;
   j. a motor signal and power cable connecting the control box to the motor;
   k. a linear actuator secured to one of the side supports opposite the motor and connected to a power supply using a linear actuator signal power cable, wherein the linear actuator engages an actuatable plate;
   l. a solenoid with a solenoid plunger, wherein the solenoid is connected to one of the side supports, wherein the solenoid engages a solenoid signal power cord that connects to a solenoid interface plug mounted to the frame or to a solenoid interface plug bracket, and wherein the solenoid plunger engages a close button of a circuit breaker; and
   m. a limit switch connected to the motor via a limit switch cable, wherein the limit switch senses a position of the charging rod and prevents over-torqueing of a charging arm on the circuit breaker when the motor operates the charging rod to charge, close, trip, or combinations thereof the circuit breaker.

19. A method for charging, closing, or tripping manually operated circuit breakers comprising:
   a. connecting a charge, close, trip device to a remote switch operator;
   b. removing any charging arms attached to a circuit breaker in an electrical room;
   c. aligning a frame of the charge, close, trip device over the circuit breaker;
   d. magnetically securing the frame to metal around the circuit breaker;
   e. attaching a charging rod of the charge, close, trip device to the circuit breaker; and
   f. flowing power and control signals from the remote switch operator through an interface plug to a motor of the charge, close, trip device to:
      (i) rotate the a charging arm of the charge, close, trip device to charge the circuit breaker;
      (ii) depress a close lever on the circuit breaker using a linear actuator of the charge, close, trip device;
      (iii) trip the circuit breaker by pressing a plunger of a solenoid against a push button on the circuit breaker; or
      (iv) combinations thereof, while an operator maintains a position outside an arc flash zone.

20. The method of claim 19, wherein the circuit breaker is a low voltage circuit breaker, a medium voltage circuit breaker, or a manually operated circuit breaker.

21. A charge, close, trip device for charging, closing, tripping or combinations thereof circuit breakers, wherein the device comprises:
   a frame;
   a magnetically shielding housing connected to the frame and containing a magnet;
   a gear box including a gear box collar that connects to a rotatable shaft that has an engagement key in a shaft key way, and wherein the gear box further includes a gear box key way and a shaft housing for engaging the rotatable shaft;
   a charging rod collar secured to the rotatable shaft opposite the gear box collar;
   a charging rod moveable mount that engages the rotatable shaft, the charging rod connected to at least one rotatable hinge secured to the charging rod moveable mount;
   a control box in communication with a motor, wherein the control box is supported by the frame; and
   a limit switch communicatively coupled to the motor, wherein the limit switch senses a position of the charging rod and prevents an over-torqueing of a charging arm on the circuit breaker when the motor operates the charging rod to charge, close, trip, or combinations thereof the circuit breaker.

* * * * *